(12) United States Patent
Guerder et al.

(10) Patent No.: US 10,933,688 B2
(45) Date of Patent: Mar. 2, 2021

(54) NOISE-ABSORBING DEVICE FOR RAILWAY VEHICLE WHEEL AND ASSOCIATED RAILWAY VEHICLE WHEEL

(71) Applicants: ALSTOM Transport Technologies, Saint-Ouen (FR); HUTCHINSON, Paris (FR)

(72) Inventors: Jean-Yves Guerder, Cavaillon (FR); Olivier Tanneau, Saint Ouen (FR); Benjamin Fays, Parmain (FR); Pierre-Emmanuel Gautheret, Le Mesnil-Esnard (FR); Yves Longueville, Torcy (FR)

(73) Assignees: ALSTOM TRANSPORT TECHNOLOGIES, Saint-Ouen (FR); HUTCHINSON, Paris (FR)

( * ) Notice: Subject to any disclaimer, the term of this patent is extended or adjusted under 35 U.S.C. 154(b) by 260 days.

(21) Appl. No.: 16/135,141

(22) Filed: Sep. 19, 2018

(65) Prior Publication Data
US 2019/0084347 A1 Mar. 21, 2019

(30) Foreign Application Priority Data

Sep. 20, 2017 (FR) ...................................... 1758721

(51) Int. Cl.
*B60B 17/00* (2006.01)
(52) U.S. Cl.
CPC ...... *B60B 17/0024* (2013.01); *B60B 17/0034* (2013.01); *B60B 17/0003* (2013.01); *B60B 2900/131* (2013.01); *B60B 2900/133* (2013.01); *B60Y 2200/30* (2013.01)

(58) Field of Classification Search
CPC ............ B60B 17/0017; B60B 17/0024; B60B 2900/133
See application file for complete search history.

(56) References Cited

U.S. PATENT DOCUMENTS

| 4,183,572 A | * | 1/1980 | Albrecht | B60B 17/0017 295/7 |
| 4,355,578 A | * | 10/1982 | Raquet | B60B 17/0017 104/306 |
| 4,364,594 A | * | 12/1982 | Raquet | B60B 17/0017 295/7 |

(Continued)

FOREIGN PATENT DOCUMENTS

| DE | 20 2006 012852 U1 | 10/2006 | | |
| EP | 65157 A1 | * | 11/1982 | ............. B60B 17/00 |

(Continued)

OTHER PUBLICATIONS

Machine translation of EP0065157, 6 pages (Year: 1984).*
FR Search Report, dated Jun. 7, 2018, from corresponding FR 1 758 721 application.

*Primary Examiner* — Jason R Bellinger
(74) *Attorney, Agent, or Firm* — Nixon & Vanderhye

(57) ABSTRACT

A noise-absorbing device for a railway vehicle wheel includes: at least one strip extending radially from a connecting end capable of being fastened to the periphery of the wheel, to a free end; and at least one damping mass fastened on a face of the free end of the strip, away from the connecting end. The strip includes at least two metal or composite layers and at least one layer of viscoelastic material gripped between the two or composite metal layers.

11 Claims, 3 Drawing Sheets

(56) References Cited

U.S. PATENT DOCUMENTS

| | | | | |
|---|---|---|---|---|
| 4,392,681 A | * | 7/1983 | Raquet | F16F 15/10 |
| | | | | 295/7 |
| 4,496,183 A | * | 1/1985 | Kasper | B60B 17/0017 |
| | | | | 295/7 |
| 4,942,080 A | | 7/1990 | Heuel et al. | |
| 5,386,894 A | * | 2/1995 | Barca | B23D 47/005 |
| | | | | 188/379 |
| 5,734,133 A | * | 3/1998 | Mayer | B60B 17/0006 |
| | | | | 105/452 |

FOREIGN PATENT DOCUMENTS

| | | |
|---|---|---|
| EP | 0 278 248 A2 | 8/1988 |
| EP | 2 230 096 A1 | 9/2010 |
| EP | 2 979 896 A1 | 2/2016 |
| WO | 2014/131676 A1 | 9/2014 |

\* cited by examiner

NOISE-ABSORBING DEVICE FOR RAILWAY VEHICLE WHEEL AND ASSOCIATED RAILWAY VEHICLE WHEEL

BACKGROUND OF THE INVENTION

Field of the Invention

The present invention relates to a noise-absorbing device for a railway vehicle wheel, of the type including at least one strip extending radially from a connecting end capable of being fastened to the periphery of the wheel, to a free end, and at least one damping mass fastened on a face of the free end of the strip, away from the connecting end.

Description of the Related Art

Such a device is known in the state of the art as a dynamic absorber or dynamic resonator. The device is fastened on the railway vehicle wheel using the strip, which is generally annular. The dynamic resonator acts as a resonator sized to vibrate at a specific frequency based on the rigidity and mass of the dynamic resonator. The dynamic resonator is capable of damping a frequency specific to an axial vibration mode of the wheel at the source of the squeaking.

This device has a drawback, since it makes it possible to lessen the squeaking generated by the wheels only on a very narrow frequency band centered on the resonance frequency of the dynamic resonator.

Thus, even if one multiplies the number of dynamic resonators, only a few wheel vibration modes are damped. A dynamic resonator does not make it possible to damp the vibration modes of the wheel other than those for which it is adjusted.

SUMMARY OF THE INVENTION

One aim of the invention is therefore to propose a noise-absorbing device for a railway vehicle wheel, capable of lessening the squeaking over a wide frequency range both around frequencies of low vibration modes as well as the higher frequency content corresponding to the higher-order vibration modes.

To that end, the invention relates to a noise-absorbing device for a railway vehicle wheel of the aforementioned type, characterized in that the strip includes at least two metal or composite layers and at least one layer of viscoelastic material gripped between the two metal or composite layers.

According to specific embodiments, the noise-absorbing device also has one or several of the features below, considered individually or according to all technically possible combinations:
  the or each strip comprises at least one radial slit extending over the free end of the strip, the or each slit delimiting a plurality of radial branches, each radial branch bearing at least one damping mass fastened on its free end;
  the or each damping mass of each radial branch has as different mass and/or a different position on the free end of the strip, from one radial branch to another;
  the device includes two parallel strips fastened to one another at their connecting ends, each strip including at least two parallel metal or composite layers and at least one layer of viscoelastic material gripped between the two metal or composite layers;
  the device is in the shape of an annular sector;
  the thickness of the viscoelastic layer is comprised between 0.05 mm and 2 mm;
  the damping mass is fastened away from the connecting end of the strip, freeing an annular space for free movement of the strip.

The invention also relates to a railway vehicle wheel comprising at least ones noise-absorbing device as defined above.

According to specific embodiments, the wheel also has one or several of the features below, considered individually or according to all technically possible combinations:
  the wheel comprises a plurality of noise-absorbing devices as defined above and the thickness of the strip of at least one of the noise-absorbing devices is different from that of another of the noise-absorbing devices;
  the wheel comprises a plurality of noise-absorbing devices as defined above distributed on the periphery of the wheel;
  at least one passage is reserved between the noise-absorbing devices for the passage of shunt cables.

BRIEF DESCRIPTION OF THE DRAWINGS

Other features and advantages of the invention will emerge from the detailed description thereof provided below, for information and non-limitingly, in reference to the appended figures, in which.

DESCRIPTION OF THE PREFERRED EMBODIMENTS

Figure 1:
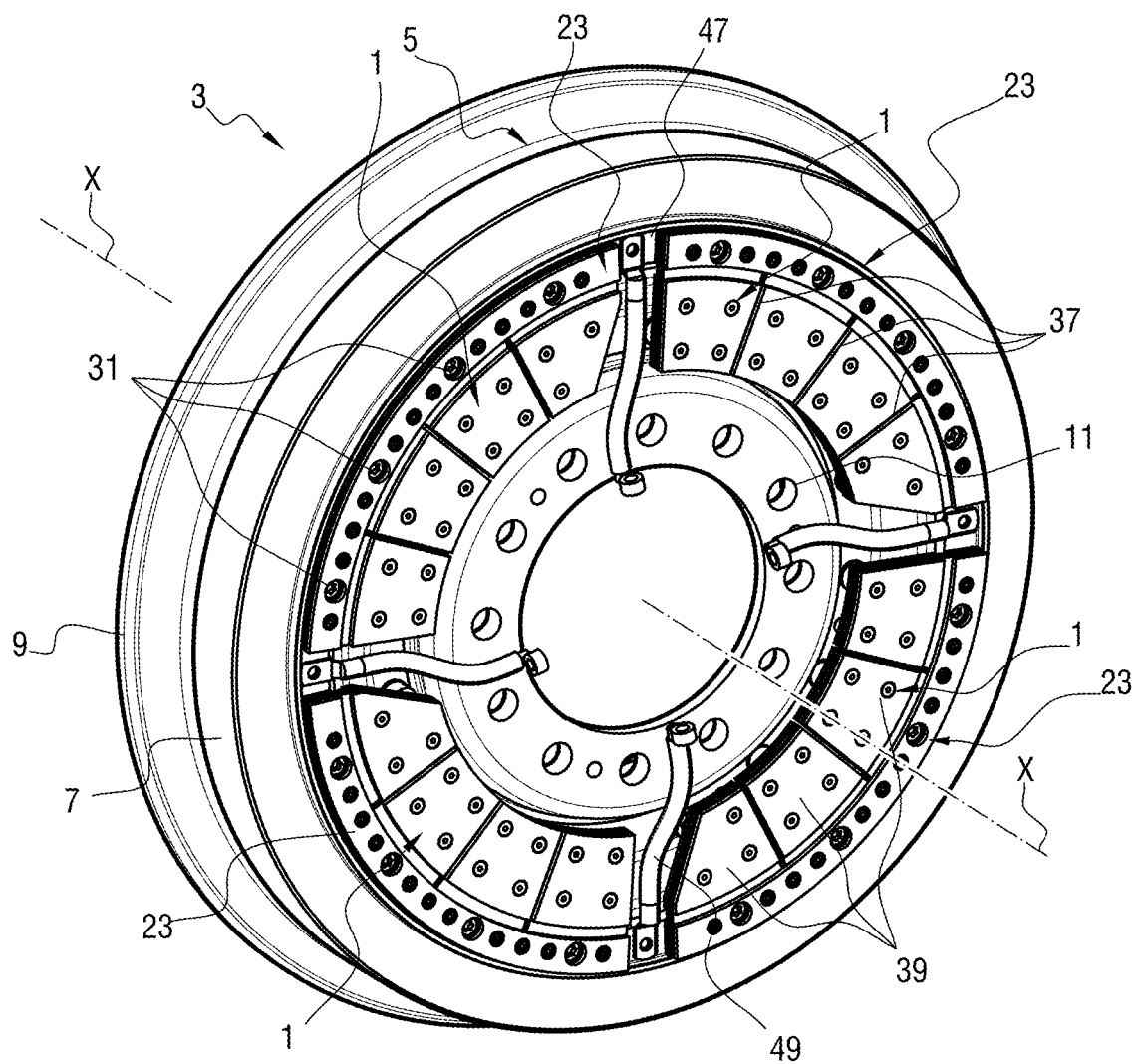
FIG. 1 is a perspective view of a railway vehicle wheel according to the invention, the wheel including four noise-absorbing devices.

FIG. 1 shows four noise-absorbing devices 1, also called anti-squeaking devices, fastened on a railway vehicle wheel 3.

The railway vehicle is for example a subway, a tram or any other vehicle on rails carrying passengers or freight.

The wheel 3 with axis X-X comprises a tire 5 delimiting a tread 7 in contact with the upper surface of the rail (not shown) and a side flange 9, which guides the wheel 3 while bearing on the side face of the rail. The side flange 9 protrudes radially and is oriented toward the inside of the rails. The wheel 3 further comprises a hub 11 and is fastened to an axle or a spindle, either by setting, or by bolting (not shown).

Figure 2:
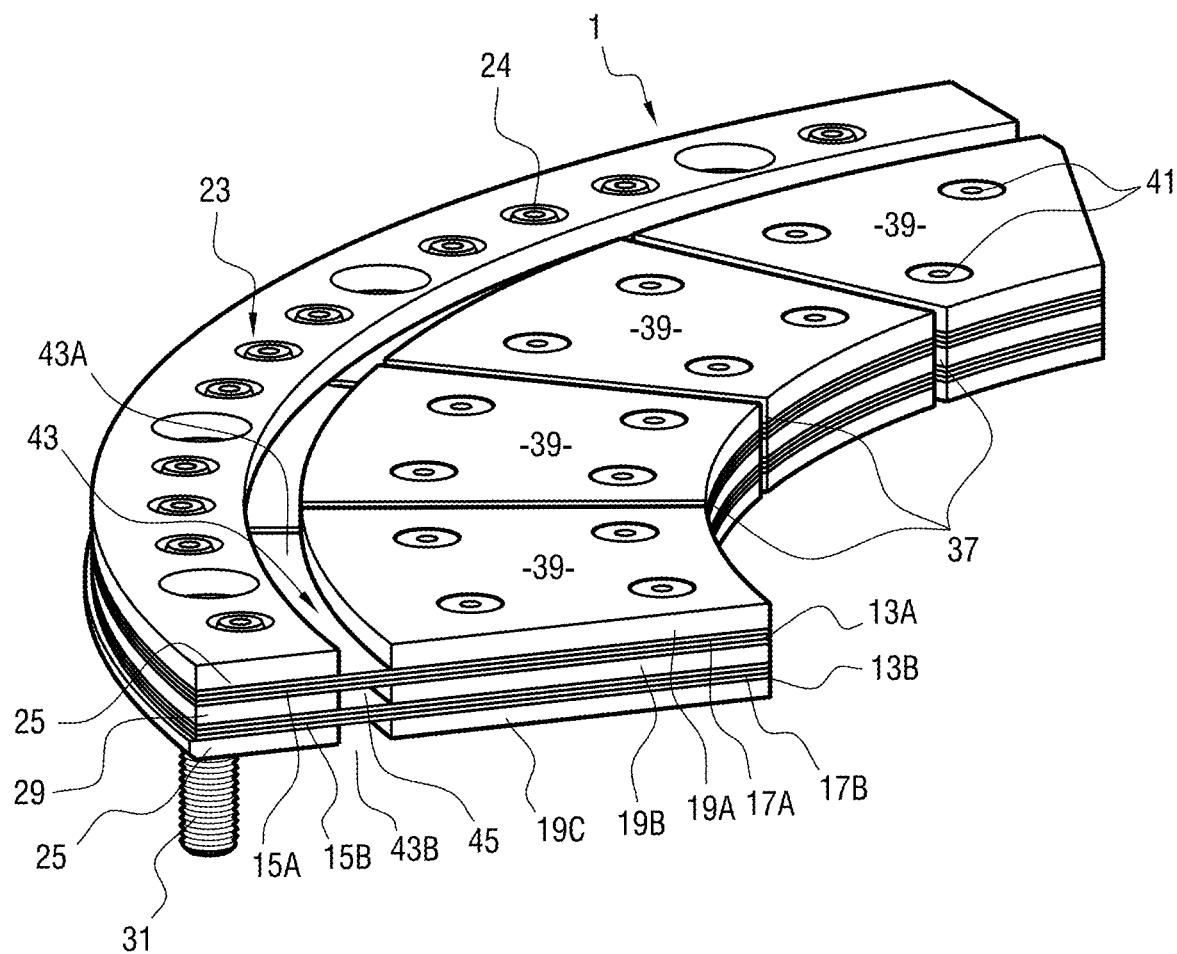
FIG. 2 is a perspective view of one of the noise-absorbing devices of FIG. 1.

The noise-absorbing device 1, shown in FIG. 2, is in the shape of an annular sector.

The noise-absorbing device 1 comprises an outer strip 13A and an inner strip 13B that extend radially from a connecting end 15A, 15B fastened to the periphery of the wheel 3, to a free end 17A, 17B, oriented toward the center of the wheel 3.

The strips 13A, 13B extend in the plane of the wheel, i.e., perpendicular to the axis X-X of the wheel 3. They are in the form of an annular sector and are parallel to one another.

Each of the strips 13A, 13B includes an inner face and an outer face, the inner face of the strip 13A being positioned across from the outer face of the strip 13B.

The device 1 further comprises damping masses 19A, 19B, 19C fastened on the inner and outer faces of the free ends 17A, 17B of the strips 13A, 13B, away from the connecting ends 15A, 15B.

More specifically, the device 1 includes a first damping mass 19A fastened on the outer face of the free end 17A, a second damping mass 19B gripped between the inner face of the free end 17A and the outer face of the free end 17B and a third damping mass fastened on the inner face of the free end 17B.

A fastening flange 23 in the form of an annular portion, as shown in FIG. 1, is fastened on the connecting end 15A, 15B of the strips 13A, 13B by gluing, or by studs, or by rivets 24.

The fastening flange 23 comprises two side fastening plates 25 between which the connecting ends 15A, 15B of the strips 13A, 13B are gripped and an intermediate fastening plate 29.

The intermediate fastening plate 29 makes it possible to maintain constant spacing between the two strips 13A, 13B and in particular between the connecting ends 15A, 15B of the strips 13A, 13B.

The fastening flange 23 comprises piercings for receiving connecting screws 31 to the wheel 3.

The free end 17A, 17B of the strips 13A, 13B extends radially toward the center of the wheel 3. It for example extends up to the hub 11 of the wheel 3, but without being in contact with the latter.

Figure 3:
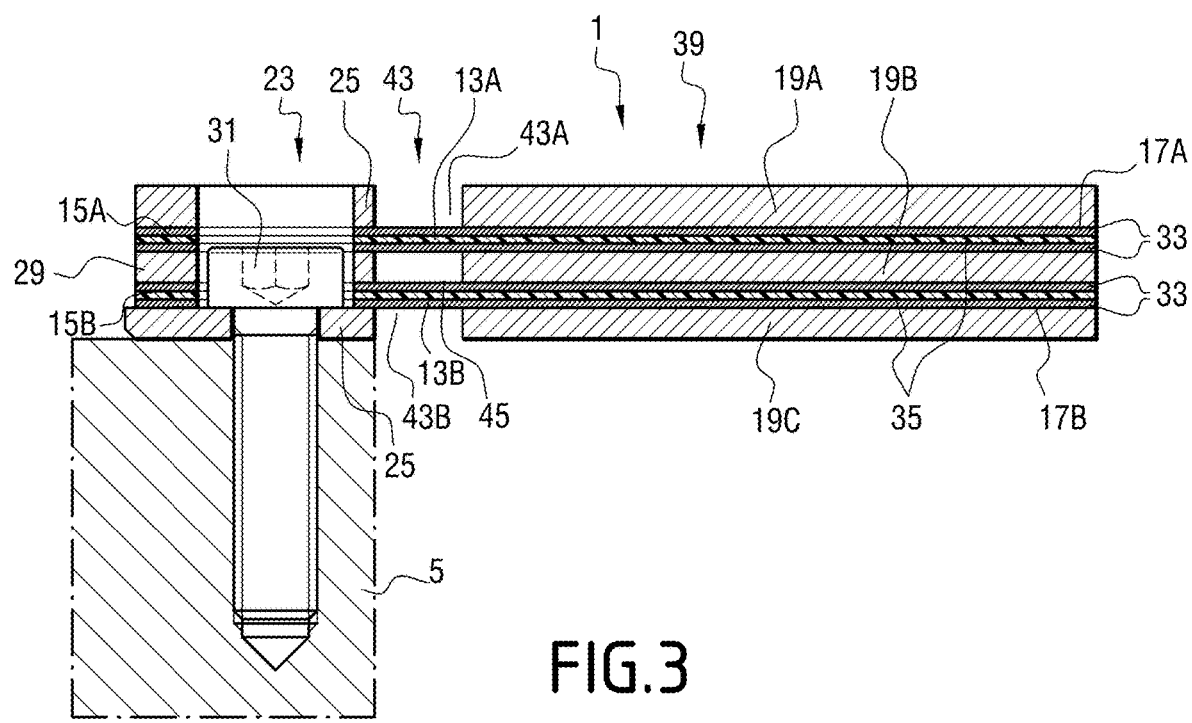
FIG. 3 is a schematic radial sectional view of the device according to the invention of FIG. 2.

As shown in FIG. 3, each strip 13A, 13B comprises at least two metal or composite layers 33 that are parallel to one another and at least one layer made from viscoelastic material 35 arranged between said metal or composite layers 33.

The two metal or composite layers 33 are adhered to the layer of viscoelastic material 35 over their entire surface.

The layers 33 are typically made from steel, aluminum, titanium, or even composite material.

The thickness of a layer 33 depends on the desired stiffness for the dynamic resonant part of the noise-absorbing device.

A viscoelastic material is a material that has intermediate rheological properties between an elastic solid and a viscous liquid. The behavior of such a material depends on a characteristic time associated with the constraint or the deformation applied on the material. Thus, in short times, for example upon impact, the behavior of the material is elastic. Conversely, in long times, the behavior of the material is viscous, for example when the material is subject to a constant stress (creep).

The layer of viscoelastic material 35 is for example made from a polymer.

Advantageously, the thickness of the viscoelastic layer 35 is between 0.05 mm and 2 mm, preferably between 0.5 mm and 1.5 mm, typically equal to 0.5 mm.

The strips 13A, 13B comprise at least one radial slit 37, visible in FIG. 1, extending in line with the free end 17A, 17B of said strips 13A, 13B. Each strip 13A, 13B then delimits, on either side of said radial slit 37, two radial branches 39.

Alternatively, the strips 13A, 13B have no radial slit 37.

In the example of FIG. 1, the strips 13A, 13B comprise three radial slits 37 delimiting four radial branches 39.

Alternatively, the number of radial branches is greater than or less than four.

The damping masses 19A, 19B, 19C for example have an annular sector shape and cover the entire surface of the free ends of the strips delimited by the radial slit 37, or at least 50% of the surface of the free ends of the strips delimited by the radial slits 37.

More generally, advantageously, for each strip, the radial surface of the strip in contact with the damping masses is greater than the radial surface of the strip in contact with the fastening plates and also the radial surface of the annular space 43.

The damping masses 19A, 19B, 19C are for example made from metal, typically steel.

A plurality of fastening members 41 pass all the way through the damping masses 19A, 19B, 19C and the strips 13A, 13B to assemble them together.

Alternatively, the damping masses 19A, 19B, 19C are glued on the strips 13A, 13B.

Typically, the thicknesses of the intermediate mass 19C and the intermediate fastening plate 29 are identical.

The damping masses 19A, 19B, 19C of each radial branch 39 advantageously have a different mass from one radial branch 39 to another.

Advantageously, the damping masses 19A, 19B, 19C of each radial branch 39 have a different position on the free end 17A, 17B of the strip 13A, 13B from one radial branch 39 to another.

The damping masses 19A, 19B, 19C are fastened away from the connecting end 15A, 15B of the strips 13A, 13B and the fastening flange 23, thus freeing an annular space 43 for free movement of the strips 13A, 13B.

The annular space 43 thus comprises two outer 43A and inner 43B grooves respectively opening toward the outside and the inside and delimited between the outer 19A and inner 19B masses, and the fastening flange 23.

The outer strip 13A, the inner strip 13B, the intermediate fastening plate 29 and the intermediate mass 19B delimit a hollow annular space 45.

The radial width of the annular space 43 for free movement is between 5 mm and 15 mm.

The widths of the outer 43A and inner 43B grooves are for example identical.

According to one embodiment that is not shown, the widths of the outer 43A and inner 43B grooves are different.

As shown in FIG. 1, the noise-absorbing devices 1 are advantageously distributed on the periphery of the wheel 3 such that at least one passage 47 can be reserved, between the noise-absorbing devices 1, for the passage of shunt cables 49 connecting the tire 5 of the wheel 3 to the axle of the wheel 3.

The wheel 3 here comprises four noise-absorbing devices 1 and four shunt cables 49.

The noise-absorbing devices 1 are typically fastened on the wheel 3 according to a regular peripheral distribution with radial symmetry.

Advantageously, the thickness of the strips 13A, 13B of each noise-absorbing device 1 of the wheel 3 is different from one noise-absorbing device 1 to another.

Also advantageously, the noise-absorbing devices 1 identical by radial symmetry.

The number of shunt cables 49 and noise-absorbing devices 1 shown in FIG. 1 is provided solely as an example.

Alternatively, the wheel 3 for example includes a single noise-absorbing device 1, for example forming a closed ring.

According to another alternative, the wheel 3 includes one or several shunt cables 49 arranged on a face of the wheel 3 opposite that which receives the noise-absorbing devices 1.

According to another alternative, the number of shunt cables 49 is less than or greater than 4, and is for example nil.

According to another alternative, the noise-absorbing devices 1 are positioned on an inner face of the wheel 3 and not on an outer face of the wheel 3 as shown in FIG. 1.

According to another alternative, the noise-absorbing devices 1 are positioned both on the inner face of the wheel 3 and on the outer face of the wheel 3.

According to another alternative, the absorbing device 1 includes a single strip or more than two strips, the number of damping masses then being adapted based on the number of strips.

According to another alternative, the strips 13A and 13B are alongside one another and the noise-absorbing device 1 has no intermediate fastening plate 29, and advantageously also the second damping mass 19B.

The operation of the noise-absorbing device 1 according to the invention will now be described.

Under the effect of the forces generated by rolling on a rail, and more particularly on curves with a small radius, the wheel 3 vibrates and causes squeaking.

The noise-absorbing device 1 according to the invention acts as a dynamic resonator or dynamic absorber adjusted to vibrate at a specific frequency that corresponds to a frequency specific to an axial vibration mode of the wheel 3.

The vibration frequency of the dynamic resonator is proportional to the square root of the ratio between the stiffness K of the dynamic resonator, which acts similarly to a spring, and a mass M formed by damping masses 19A, 19B, 19C.

The stiffness K of the device 1 according to the invention in particular depends on the stiffness of each of the strips 13A, 13B, the distance between the two strips 13A, 13B, and the width of the annular space 43 for free movement, i.e., the position of the damping masses 19A, 19B, 19C on the free end 17A, 17B of each of the strips 13A, 13B.

Each radial branch 39 of the noise-absorbing device 1 thus acts as an independent dynamic resonator and makes it possible to damp a specific frequency of the squeaking of the wheel.

Thus, the device 1 lessens the specific frequencies related to the orders of the modes of the wheel 3 most affected by the squeaking on a curve.

The frequencies associated with the higher wheel modes (higher frequencies) are handled by the structural damping. The damping masses 19A, 19B, 19C fastened on the strips 13A, 13B vibrate radially relative to one another and shear the layers of viscoelastic material 35 of the strips 13A, 13B, making it possible to dissipate energy.

Thus, the noise-absorbing device 1 according to the invention is particularly advantageous, since it makes it possible to reduce the squeaking of the wheel 3. Indeed, it acts on a wide frequency range by coupling the advantages of the damping by dynamic resonator and damping by shearing a viscoelastic layer.

The device according to the invention 1 also has the advantage of being able to be installed on existing equipment and being sized based on particular wheel modes.

In one embodiment that is not shown, the noise-absorbing device comprises a single strip. The fastening flange then comprises only an outer fastening plate and an inner fastening plate that keep the strip fastened to the tire 5 of the wheel 3.

The strip comprises a structure identical to what was described previously and the device then comprises two damping masses fastened on each of the faces of the free end of the strip.

The embodiments and alternatives considered above can be combined with one another to create new embodiments of the invention.

The invention claimed is:

1. A noise-absorbing device for a railway vehicle wheel, comprising:
    at least one strip extending radially from a connecting end capable of being fastened to the periphery of the wheel, to a free end,
    at least one damping mass fastened on a face of the free end of the strip, away from the connecting end,
    wherein the strip includes at least two metal or composite layers and at least one layer of viscoelastic material gripped between the two metal or composite layers.

2. The noise-absorbing device according to claim 1, wherein the at least one strip comprises at least one radial slit located at a free end of the strip, the at least one radial slit delimiting a plurality of radial branches, each radial branch bearing at least one damping mass fastened on a free end of the radial branch.

3. The noise-absorbing device according to claim 2, wherein the at least one damping mass of each radial branch has a different mass and/or a different position on the free end of the strip, from one radial branch to another.

4. The noise-absorbing device according to claim 1, wherein the device includes two parallel strips fastened to one another at connecting ends thereof, each strip including at least two parallel metal or composite layers and at least one layer of viscoelastic material gripped between the two metal or composite layers.

5. The noise-absorbing device according to claim 1, wherein the device is in the form of an annular sector.

6. The noise-absorbing device according to claim 1, wherein the thickness of the viscoelastic layer is comprised between 0.05 mm and 2 mm.

7. The noise-absorbing device according to claim 1, wherein the damping mass is fastened away from the connecting end of the strip, freeing an annular space for free movement of the strip.

8. A wheel for a railway vehicle comprising at least one noise-absorbing device according to claim 1.

9. The wheel for a railway vehicle according to claim 8, wherein the wheel comprises a plurality of the noise-absorbing devices, the thickness of the strip of at least one of the noise-absorbing devices being different from that of another of the noise-absorbing devices.

10. The wheel for a railway vehicle according to claim 8, wherein the wheel comprises a plurality of the noise-absorbing devices, distributed on the periphery of the wheel.

11. The wheel for a railway vehicle according to claim 10, wherein at least one passage is reserved between the noise-absorbing devices for the passage of shunt cables.

* * * * *